No. 627,682. Patented June 27, 1899.
W. CHAPLEAU.
BICYCLE LAMP ATTACHMENT.
(Application filed Dec. 14, 1898.)
(No Model.)
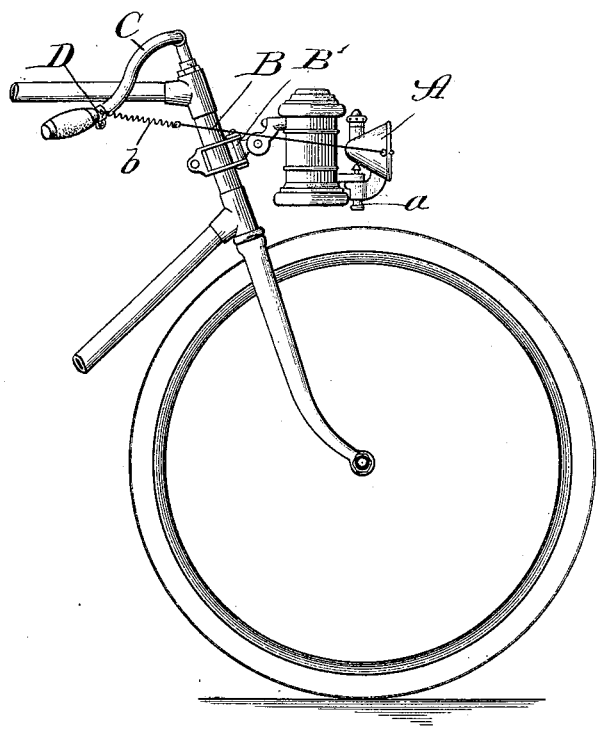
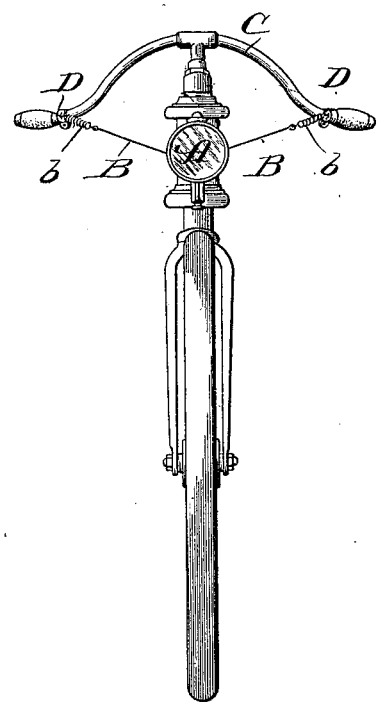
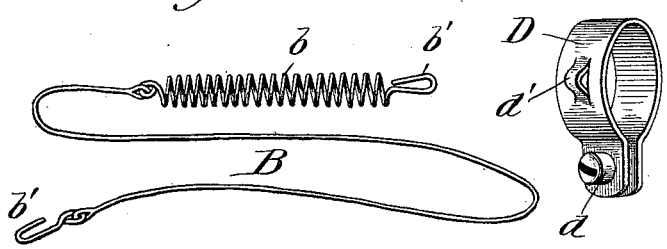
Witnesses:
Inventor:
Wildric Chapleau,
By Banning & Banning & Sheridan
Attys

UNITED STATES PATENT OFFICE.

WILDRIC CHAPLEAU, OF CHICAGO, ILLINOIS, ASSIGNOR TO JOHN HEWITT, ORLANDO S. GAUCH, DAVID J. WILSON, EMIL A. PAULI, AND CHARLES T. BLACKFORD, OF SAME PLACE.

BICYCLE-LAMP ATTACHMENT.

SPECIFICATION forming part of Letters Patent No. 627,682, dated June 27, 1899.

Application filed December 14, 1898. Serial No. 699,287. (No model.)

*To all whom it may concern:*

Be it known that I, WILDRIC CHAPLEAU, a citizen of the United States, residing at Chicago, in the county of Cook and State of Illinois, have invented certain new and useful Improvements in Bicycle-Lamp Attachments, of which the following is a specification.

The object of my invention is to enable the rider of a bicycle to turn the reflector of his lamp to the one side or the other while riding along either at will or automatically with the motion of the handle-bar; and my invention consists in the features and details of construction hereinafter described and claimed.

In the drawings, Figure 1 is a side elevation of the front portion of a bicycle, showing my invention applied thereto. Fig. 2 is a front elevation of the same, and Figs. 3 and 4 are perspective views of details hereinafter described.

In making my improvement I employ a reflector A, which is mounted on a vertical pivot $a$, so that it can be readily turned to the one side or the other and thus direct the light of the lamp to the one side or the other.

In order to place the adjustment or movements of the lamp-reflector within the control of the rider, I carry cords B back from the opposite sides of the reflector to near the outer ends of the handle-bar C, to which they are connected. I preferably provide the cords with a spring section or portion $b$, although, if desired, the entire cord may be made of elastic material. I provide the handle-bar with clips D, preferably made as shown in Fig. 3, so that they can be sprung apart and inserted over the handle-bar and then held or fastened together by a screw $d$. I provide the forward side of these clips with an eye $d'$, struck out of the metal, as shown in Fig. 3. I provide the cords with hooks $b'$ at the ends, so that they can be hooked into the eyes on the clips D and into holes provided at the opposite sides of the reflector A. This will be readily understood from an inspection of Fig. 1. This permits of the cords being readily taken off and put on again, as may be desired. In riding every motion of the handle-bar will be communicated through the cords to the reflector, so that it will instantly turn automatically with and as the handle-bar and steering-wheel are turned. If desired also, the rider may while going straight ahead turn the reflector to the one side or the other by hand independently of the handle-bar or wheel by drawing with his hand on the appropriate cord. While the cords are intended to be elastic or to have an elastic section in them, it is desirable that the elastic sections should exert sufficient and equal tensions when the reflector is in its normal position directly over the front wheel, so as to return said reflector to that position when they are left free to do so. Whenever it is desired to remove the cords, they can be unhooked at their ends, leaving the clips D on the handle-bar.

Although the drawings illustrate the reflector as mounted on a vertical pivot and although I have so described it, yet it is obvious that the lamp itself, which is pivoted to the frame at B', may have the reflector rigidly fastened to it, so that both may be turned together upon the pivot B', by which the lamp is connected to the frame, as shown. I regard this as an immaterial circumstance and merely mention it to show that I have it in mind, and that I intend when I speak in the claims of a "pivoted reflector" or "reflector turning on a vertical pivot" to include any arrangement of the reflector or lamp on a vertical pivot, so that the reflector can be turned either by itself or in conjunction with the lamp on such vertical pivot.

What I regard as new, and desire to secure by Letters Patent, is—

1. The combination with the frame and handle-bar of a bicycle; of a lamp and reflector pivotally connected to the front end of the frame, and connections substantially as described whereby the reflector is turned by and in unison with the handle-bar, substantially as described.

2. The combination of the frame and handle-bar of a bicycle, the lamp attached to the frame, and a pivotally-mounted reflector; with cords connecting the reflector with the opposite ends of the handle-bar, substantially as described.

3. The combination of the bicycle-frame, the lamp attached thereto and the reflector pivotally mounted on the lamp; with the handle-bar and the connections between the opposite ends of the handle-bar and the said reflector, whereby it is turned by and in unison with the handle-bar, substantially as described.

4. In a bicycle, the combination of the frame, the handle-bar and the lamp supported on the frame, and the pivoted reflector; with the detachable resilient connections between the reflector and the opposite ends of the handle-bar, for the purpose and substantially as described.

5. In a bicycle, the combination of the frame, the lamp attached thereto, and the reflector pivotally mounted on said lamp; with the detachable resilient connections, respectively united to the opposite sides of the reflector and to the opposite ends of the handle-bar, for the purpose and substantially as described.

WILDRIC CHAPLEAU.

Witnesses:
THOMAS A. BANNING,
THOMAS B. MCGREGOR.